(12) United States Patent  
Guan et al.

(10) Patent No.: US 7,898,766 B2
(45) Date of Patent: Mar. 1, 2011

(54) FOUR SIDED SHIELD STRUCTURE FOR A PERPENDICULAR WRITE HEAD

(75) Inventors: Lijie Guan, Milpitas, CA (US); Yaw Shing Tang, Saratoga, CA (US); Hung Liang Hu, Los Altos, CA (US)

(73) Assignee: Headway Technologies, Inc., Milpitas, CA (US)

( * ) Notice: Subject to any disclaimer, the term of this patent is extended or adjusted under 35 U.S.C. 154(b) by 661 days.

(21) Appl. No.: 12/008,152

(22) Filed: Jan. 9, 2008

(65) Prior Publication Data
US 2008/0112082 A1 May 15, 2008

Related U.S. Application Data

(62) Division of application No. 10/828,888, filed on Apr. 21, 2004, now Pat. No. 7,322,095.

(51) Int. Cl.
*G11B 5/127* (2006.01)
(52) U.S. Cl. .................................... 360/125.3
(58) Field of Classification Search ............ 360/324.11, 360/324.1, 324.2, 324.12, 125.3, 122, 313, 360/128, 125.03, 125.02, 125.09, 125.17, 360/125.12; 29/603.07, 603.11, 603.13
See application file for complete search history.

(56) References Cited

U.S. PATENT DOCUMENTS

| 4,935,832 | A | 6/1990 | Das et al. |
| 5,173,821 | A | 12/1992 | Maloney |
| 5,600,519 | A | 2/1997 | Heim et al. |
| 5,995,343 | A | 11/1999 | Imamura |
| 2008/0232000 | A1* | 9/2008 | Flint et al. ................. 360/319 |

FOREIGN PATENT DOCUMENTS

| JP | 2002-133610 | 5/2002 |
| JP | 2004-030838 | 1/2004 |

OTHER PUBLICATIONS

"One Terabit per Square Inch Perpendicular Recording Conceptual Design," by M.Mallary et al., IEEE Trans. on Magnetics, vol. 38, No. 4, Jul. 2002, pp. 1719-1724.

* cited by examiner

*Primary Examiner*—Allen T Cao
(74) *Attorney, Agent, or Firm*—Saile Ackerman LLC; Stephen B. Ackerman

(57) ABSTRACT

The traditional single pole perpendicular writer has two major problems—insufficient field gradient in the down track direction and adjacent track erasure (ATE) caused by side fringing fields. These problems have been overcome by tapering the main pole and then shielding it on all four sides.

15 Claims, 4 Drawing Sheets

FOUR SIDED SHIELD STRUCTURE FOR A PERPENDICULAR WRITE HEAD This is a divisional application of U.S. patent application Ser. No. 10/828,888, filed on Apr. 21, 2004 now U.S. Pat. No. 7,322,095, which is herein incorporated by reference in its entirety, and assigned to a common assignee.

FIELD OF THE INVENTION

The invention relates to the general field of magnetic disk storage systems with particular reference to shielding perpendicular write heads.

BACKGROUND OF THE INVENTION

One of the key advantages of single-pole (SP) head/media, with a magnetically soft underlayer (SUL) and a perpendicular recording system, is the capability to provide a larger write field (than that of a ring head) to enable writing into the relatively thick media with high anisotropy constant. The latter quality leads one to assume better thermal stability associated with perpendicular recording.

FIG. 1 is a schematic representation of a typical single pole vertical recording system of the prior art. Seen there is single write pole 13 whose ABS (air bearing surface) moves parallel, and close to, the surface of recording medium 16. The latter comprises an upper, high coercivity, layer (not shown) on a magnetically soft underlayer. Coils 12 generate magnetic flux in yoke 11 which passes through main pole 14 into tip 13 and then into media 16 (where a bit is written). The magnetic circuit is completed by flux that passes through the soft under layer and then back into return pole 11. The space enclosed by the yoke and poles is normally filled with insulating material 17.

The traditional single pole perpendicular writer with soft underlayer has two major problems—insufficient field gradient in the down track direction and adjacent track erasure (ATE) caused by side fringing fields. The second problem becomes even more severe when the neck height of the single pole is reduced so as to increase the write field, i.e. overwrite (OW) capability.

A shielded pole perpendicular writer has been proposed to improve field gradient and to reduce ATE [1]. Unfortunately, the presence of shields also reduces the perpendicular field component so a shielded pole head will generate insufficient write field, even taking into consideration the increased in-plane field. Proper design of a shield pole head should take both ATE improvement and OW performance into consideration.

A routine search of the prior art was performed with the following references of interest being found:

A tapered pole is described in U.S. Pat. No. 5,173,821 while Inamura describes a tapered pole portion at the tip in U.S. Pat. No. 5,995,343. In U.S. Pat. No. 5,600,519, Heim et al teach the use of a tapered pole tip to increase the head field and, in U.S. Pat. No. 4,935,832, Das et al. show side shields around the write pole.

REFERENCES

[1] M. Mallary, A. Torabi, and M. Benakly "One terabit per square inch perpendicular recording conceptual design" IEEE Trans. Mag. 38 no. 4 1719-1724 July 2002.

SUMMARY OF THE INVENTION

It has been an object of at least one embodiment of the present invention to provide a method to improve the magnetic field distribution of a single pole magnetic write head.

Another object of at least one embodiment of the present invention has been that said improved write head have minimum adjacent track erasure.

These objects have been achieved by shielding the main write pole on all four sides, with the regular return pole also serving as the leading edge shield. Additionally, the main pole is tapered. Tapering has also been used in conventional designs but, without the additional shields disclosed by the present invention, tapered shields suffer from excess adjacent track erasure. Optionally, the leading edge and side shields may be magnetically connected as well.

DESCRIPTION OF THE PREFERRED EMBODIMENTS

Figure 1:
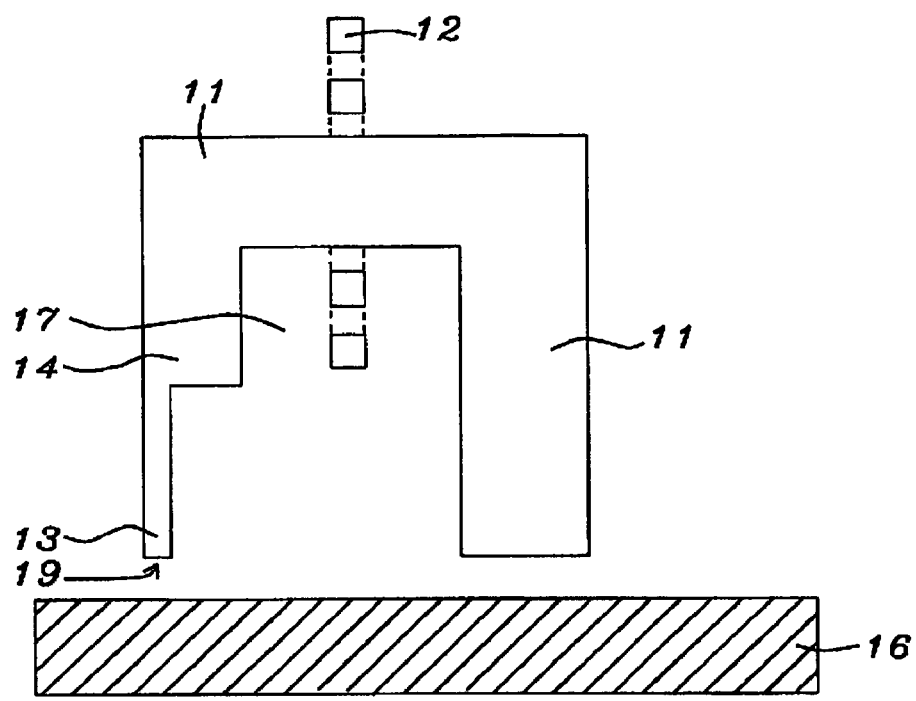
FIG. 1 shows a typical single pole magnetic write head.
Figure 2:
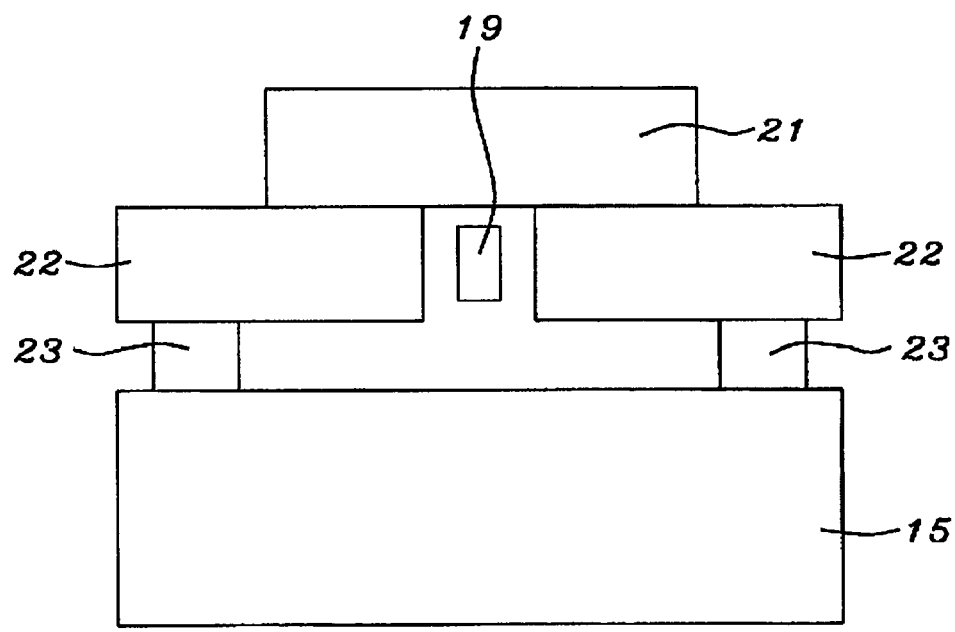
FIG. 2 is an ABS view of the four sided shielding structure of the invention.

Referring now to FIG. 2 where the principal elements of the invention can be seen from an ABS view as leading shield 15 (which is connected to the return pole as shown in FIG. 1), a trailing shield 21, and two opposing side shields 22. The main pole 19 (see 13 in FIG. 1), sometimes also referred to as the write pole, is separated from shields by a different amount in each direction. Trailing shield 21, separated from main pole with a gap GT, effects the sharp magnetic field gradient needed for high linear density applications.

The side shield 22, separated from main pole 19 by a gap GS, prevent side-fringing magnetic fields from reaching the media and thereby reduce ATE. The leading shield 15, separated from the main pole by a gap GL, blocks field leakage from the leading side and also bridges the return pole and the trailing/side shields to keep the magnetic potential of the trailing/side shield grounded. Optionally, the side and leading shields may be magnetically connected to one other through connectors 23. Leading gap GL is usually larger than GT and GS, so that the field loss due to GL is negligible. Note that even though trailing and side shields are marked as different functional components in FIG. 2, they may be fabricated simultaneously during device processing. To minimize the field loss, the thicknesses of the trailing shield and side shields are kept small (typically between about 0.05 and 0.4 microns).

Figure 3:
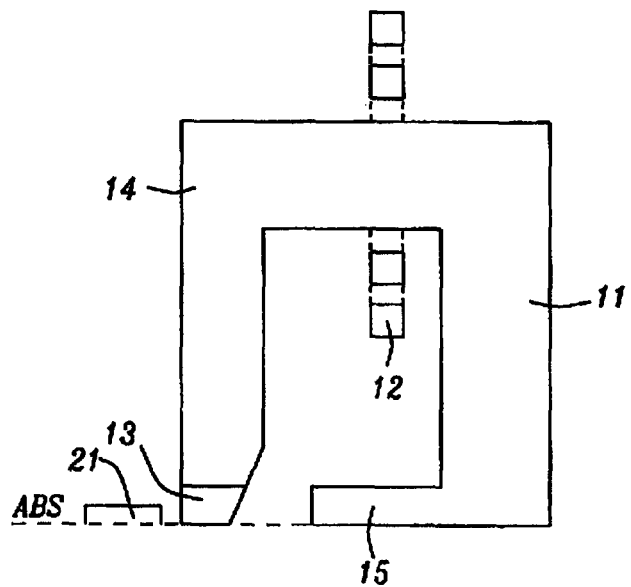
FIG. 3 shows FIG. 1 modified to include the features of the invention.

FIG. 3 shows a side view of the head structure. In order to compensate for the loss of magnetic fields due to leakage to the shields, the main pole is tapered, preferably at the leading side to maintain high trailing field gradients. The combination of tapered main pole and leading shield increases the head field and minimizes magnetic field spread at the leading edge.

Figure 4:
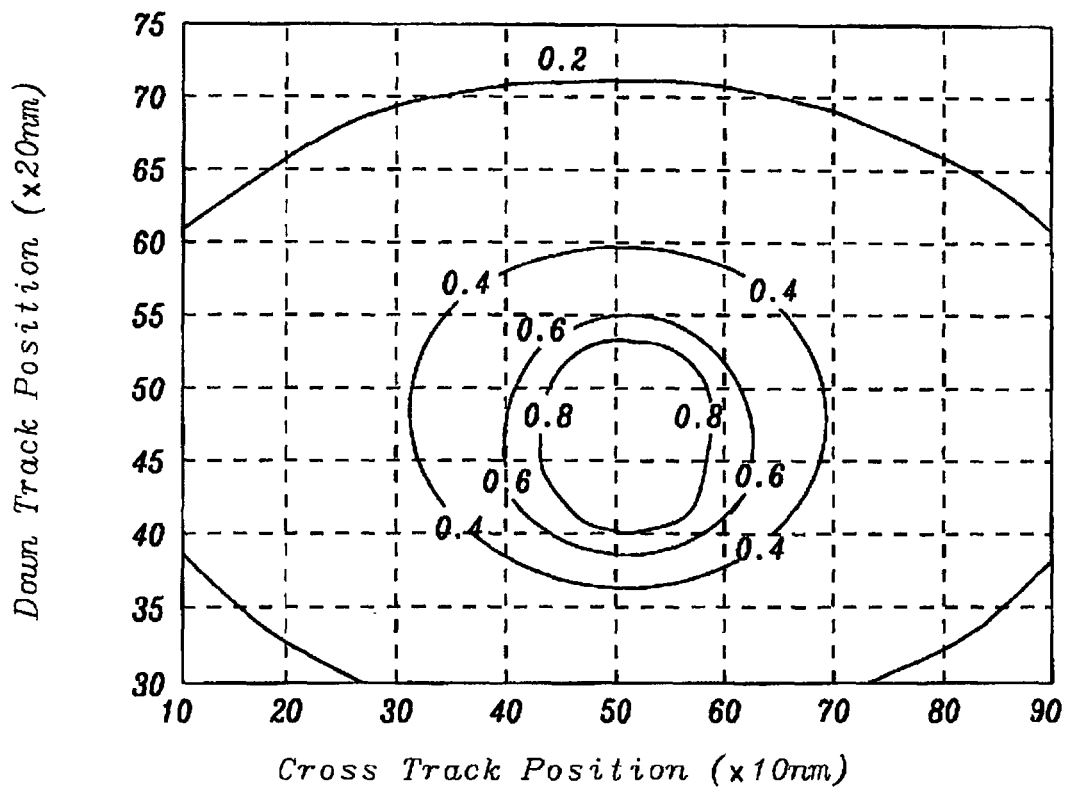
FIGS. 4-6 compare contours of constant field magnitude for several configurations.
Figure 5:
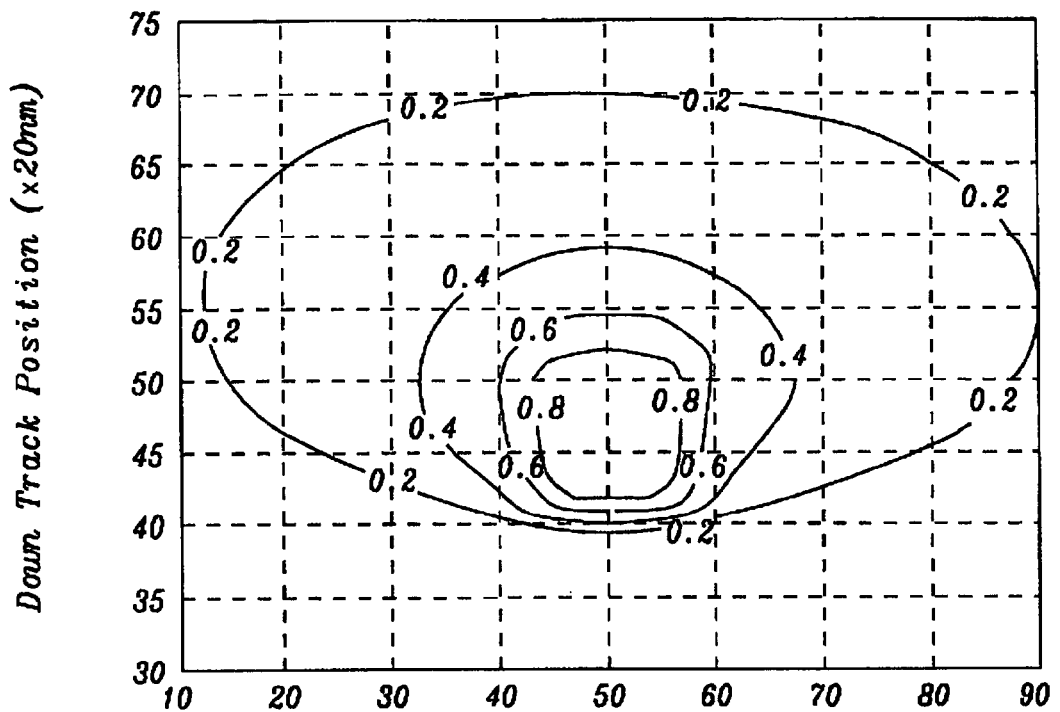
Figure 6:
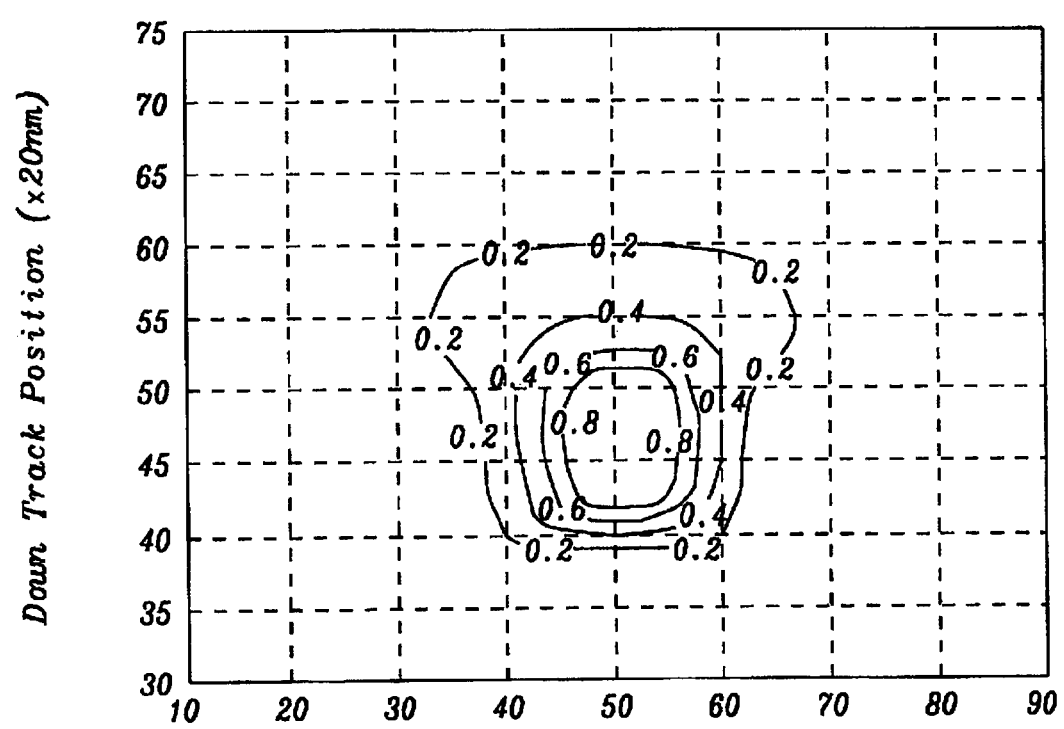

FIGS. 4-6 compare contours of constant field magnitude for a single pole head (FIG. 4), a single pole with trailing shield only (FIG. 5), and the shielded pole head of the present invention (FIG. 6). In all cases, the main pole had a 30 deg tapering angle. In the calculation, the following parameters were used: GT=50 nm, GS=100 nm, GL=300 nm. The spacing from head Air Bearing Surface (ABS) to soft underlayer was 50 nm. The thickness of trailing and side shield was about 0.1 microns while the thickness of the leading shield was about 0.3 microns. A large field gradient at the trailing edge that nevertheless confines the side-fringing field can be easily seen in the case of the structure of the present invention (FIG. 6). Without the side shields, the tapered pole heads would have produced side-fringing magnetic fields that were too large, thus causing excessive ATE.

Figure 7:
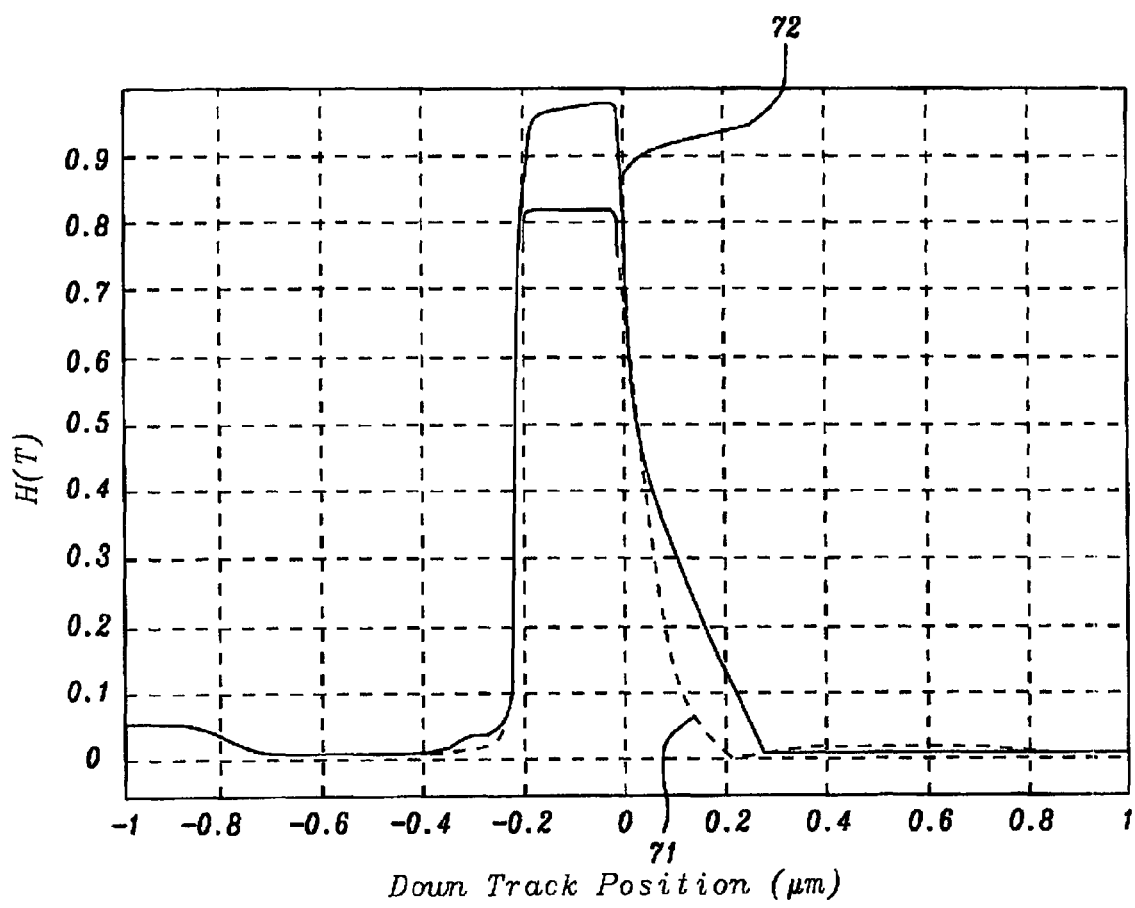
FIG. 7 shows the enhancement due to the leading-edge tapered pole head.

FIG. 7 illustrates the calculated magnetic field enhancement due to the leading-edge tapered pole head. At a tapering angle of 30 degrees (curve 72), the write field is increased by more than 1500 Oe compared to a pole having zero taper (curve 71). The corresponding shielded tapered head produces as much magnetic field as does a single pole head with only a trailing shield but without any taper. In the latter case, the taper could not be used in any case because of excessive ATE. In short, the proposed shielded tapered-pole head achieves an optimal design in the trade-off between maximum write fields and minimum fringing fields at the price of a slight increase in head processing complexity.

In order to fully facilitate reproduction of the invention by interested parties, the following enabling information is supplied: The return pole width is between about 10 and 50 microns. The distance between write pole and trailing shield is between about 0.02 and 0.2 microns. The trailing shield has a thickness between about 0.05 and 0.4 microns. The tapering of the write pole is at an angle of between about 15 and 65 degrees, relative to the vertical. The tapering of the write pole may begin at an edge that is closest to a trailing edge or it may begin at an edge that is closest to a leading edge. Each side shield has a width between about 0.2 and 5 microns. The distances between each of the side shields and the write pole is between about 0.02 and 0.2 microns. Each side shield is between about 0.05 and 5 microns from the leading shield. Each side shield has a thickness between about 0.05 and 0.4 microns. The return pole has a thickness between about 0.5 and 5 microns. The write pole length is between about 0.1 and 0.5 microns and the amount by which the side shield width exceeds the write pole length is up to about 0.2 microns.

What is claimed is:

1. A shield for a perpendicular write head having an air bearing surface, a write pole with a length and a first width, a leading shield, and a return pole with a second width, comprising:
   said write pole being tapered so that its width increases with increasing distance from the air bearing surface;
   a trailing shield, whose bottom surface is coplanar with the air bearing surface and that has a first width, symmetrically located at a first distance behind said write pole;
   a pair of side shields, that contact said trailing shield and that have bottom surfaces coplanar with the air bearing surface, located a second distance from opposing edges of the write pole, said side shields having opposing outer edges separated by an amount equaling said second width, and widths that exceed the length of the write pole by an amount; and
   said side shields being magnetically connecting to said return pole.

2. The shield described in claim 1 wherein said write pole first width at the air bearing surface is between about 0.05 and 0.4 microns.

3. The shield described in claim 1 wherein said return pole second width is between about 10 and 50 microns.

4. The shield described in claim 1 wherein said first distance, between write pole and trailing shield, is between about 0.02 and 0.2 microns.

5. The shield described in claim 1 wherein said trailing shield has a thickness between about 0.05 and 0.4 microns.

6. The shield described in claim 1 wherein the tapering of said write pole is at an angle of between about 15 and 65 degrees, relative to the vertical.

7. The shield described in claim 1 wherein said tapering of the write pole begins at an edge that is closest to said trailing shield.

8. The shield described in claim 1 wherein said tapering of the write pole begins at an edge that is closest to the return pole.

9. The shield described in claim 1 wherein each side shield has a width between about 0.2 and 5 microns.

10. The shield described in claim 1 wherein said second distances, between each of said side shields and said write pole, is between about 0.02 and 0.2 microns.

11. The shield described in claim 1 wherein each side shield is between about 0.05 and 5 microns from said leading shield pole.

12. The shield described in claim 1 wherein each side shield has a thickness between about 0.05 and 0.4 microns.

13. The shield described in claim 1 wherein said return pole has a thickness between about 0.5 and 5 microns.

14. The shield described in claim 1 wherein said write pole length is between about 0.1 and 0.5 microns.

15. The shield described in claim 1 wherein said amount by which the side shield width exceeds the write pole length is up to about 0.2 microns.

* * * * *